United States Patent [19]

Bell

[11] Patent Number: 4,845,913
[45] Date of Patent: * Jul. 11, 1989

[54] HOLDING STRAP

[76] Inventor: Peter D. Bell, P.O. Box 788, Merritt Island, Fla. 32952

[*] Notice: The portion of the term of this patent subsequent to Feb. 28, 2006 has been disclaimed.

[21] Appl. No.: 109,515

[22] Filed: Oct. 19, 1987

[51] Int. Cl.$^4$ .............................................. E04B 1/38
[52] U.S. Cl. ....................................... 52/699; 52/220; 174/48
[58] Field of Search ........................ 52/699, 220, 221; 411/461, 462, 463, 466; 174/48; 248/65, 71, 74.5, 546, 300

[56] References Cited

U.S. PATENT DOCUMENTS

| | | | |
|---|---|---|---|
| 1,968,596 | 7/1934 | Benander | 174/48 X |
| 2,540,305 | 2/1951 | Tomlinson | 52/220 X |
| 3,297,815 | 1/1967 | Drettman | 174/48 |
| 3,350,501 | 10/1967 | Jureit | 174/48 X |
| 3,515,797 | 6/1970 | Hochstetler | 174/48 X |
| 3,553,346 | 1/1971 | Ballantyne | 174/48 |
| 3,689,681 | 9/1972 | Searer et al. | 174/48 |
| 4,472,860 | 9/1984 | Österlind | 248/65 X |

Primary Examiner—David A. Scherbel
Assistant Examiner—Creighton Smith
Attorney, Agent, or Firm—Dennison, Meserole, Pollack & Scheiner

[57] ABSTRACT

A holding strap for securing service lines to furring strips and the like wherein the strap includes a planar face panel with a generally arcuate flange extending laterally from one end thereof. The face panel including a nailing prong turned laterally therefrom to the same side as the flange in longitudinally spaced relation thereto. The flange defines a pocket opening to the same side of the face panel beyond which the flange extends.

6 Claims, 1 Drawing Sheet

U.S. Patent    Jul. 11, 1989    4,845,913

HOLDING STRAP

BACKGROUND OF THE INVENTION

The invention is generally concerned with securing service lines, for example tubular conduits, Romex cable and the like, to unfinished wall surfaces, principally block walls. The general environment of the invention is similar to that of applicant's co-pending application Ser. No. 077,457, filed July 24, 1987, for "Wire Holding Nail Plate".

In running service lines, normally electric cabling or wiring, along block walls, a variety of means have been used to secure the lines. One example of such means is discussed in the above application and comprises the use of staples engaged over a service line received along a support ledge of a furring strip and driven into the furring strip. The use of such staples is less than desirable both because of the difficulties in driving the staples into the narrow upper edge of a furring strip, and the greater problem of the tendency of the furring strips to loosen when subjected to the driving force on the staples perpendicularly to the nails which mount the furring strips.

It has also been proposed to mount the wiring or the like directly to the wall surface utilizing a strap which includes a planar panel fastened directly to the wall surface and an outwardly projected integral loop at one end thereof which encircles the cable and engages the cable against the wall surface. Such straps are normally mounted utilizing a driven anchor or shot-pin, both procedures of which are costly in materials and labor. Examples of these straps will be noted in U.S. Pat. Nos. 1,365,629, issued Jan. 11, 1921, and 3,430,905, issued Mar. 4, 1969.

SUMMARY OF THE INVENTION

The present invention proposes a holding strap which effectively positions and secures service lines, i.e. tubular conduits, Romex wire, and the like, to furring strips on unfinished block walls and like structures without affecting the mounted stability of the furring strip or the planar outer face thereof which receives wall board, paneling, etc.

The proposed holding strap eliminates the difficulties and expense associated with the use of conventional loop-defining straps which mount directly to the block wall, and avoid the disadvantages associated with the use of staples as a means for mounting service lines to furring strips along the narrow edges thereof.

In avoiding the problems associated with conventional wire or cable mounting means, the strap of the invention effectively clamps the service line to the narrow edge of a furring strip independently of the adjacent block wall and in manner which precludes lateral shifting of the service line.

Other advantages of the holding strap of the invention are derived from the unitary construction thereof and the manner in which the strap incorporates, as an integral part thereof, a driven fastener. Each strap is self-contained, avoiding both the expense and time-consuming manipulative steps associated with the use of separate fasteners.

The holding strap of the invention is formed from sheet metal, for example 16 or 18 gauge galvanized steel. The basic strap is a narrow member approximately 1.7 cm. wide and includes an elongate planar face panel with a laterally arcing retaining flange integral at one end thereof. The face panel, at a point spaced from the flange, includes a mounting prong folded laterally therefrom to the same side as the flange. In use, the service line will engage along a support edge of the furring strip or the like. The arced flange of the strap is positioned over the service line and the service line snuggly drawn onto the strip edge with the planar face panel engaged against the face of the strip, at which point the integral fastener is driven into the strip to mount the strap. The planar nature of the face panel provides only an inperceptible variation in the nailing face of the furring strip, easily accommodated by wall board or paneling. Other than for this minimal thickness of the material itself, there is no interruption in the planar surface of the furring strip, notwithstanding the mounting of the holding strap on the strip itself as opposed to the substantially more expensive and troublesome mounting of holding straps directly to a block wall or the like.

Depending upon the specific nature of the service line to be mounted, the size of the holding strap can vary with an approximate minimal size, for ease of handling combined with an effective holding action, being as little as 1 cm. wide and 3.5 cm. long, the strap thus formed including a face panel with a laterally directed generally arcing retaining flange or head at one end thereof and a laterally directed fastening prong formed at the second end thereof.

Other objects and features of the invention will become apparent from the more detailed description of the invention following hereinafter.

DESCRIPTION OF PREFERRED EMBODIMENTS

Figure 1:
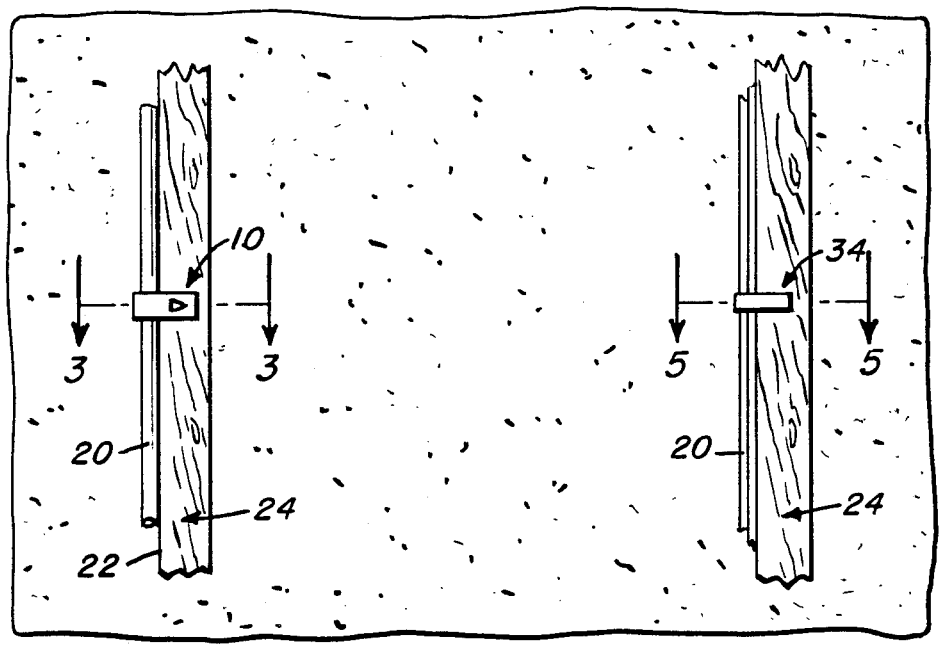
FIG. 1 is an elevational view of a wall section with vertical furring strips mounting thereon, each having a holding strap affixed thereto.
Figure 2:
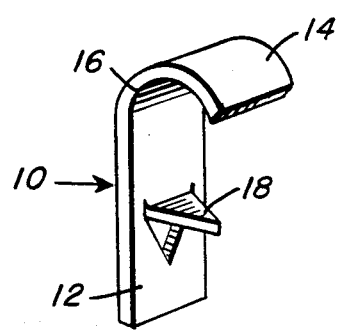
FIG. 2 is a perspective view of one of the holding straps of FIG. 1.

Referring now more specifically to the drawings, reference numeral 10 is used to designate the holding strap of the invention. The strap 10 is formed from sheet metal, preferably 18 gauge galvanized steel, and includes a planar elongate face or nailing panel 12 with a laterally directed arcing flange 14 integral at one end thereof. The flange includes a generally downwardly directed outer edge portion or lip laterally spaced from the upper end of the face panel 12 to define a receiving pocket 16.

At approximately mid-height or slightly therebelow, a central triangular portion is formed from the face panel and laterally folded to define a pointed nailing prong 18 projecting to the same side of the face panel 12 as the flange 14 in substantial spaced relation thereto.

Typically, the mounting strip 10 will be 1.7 cm. wide and have a total height of 5.0 cm. The flange will project 1.8 cm. while the prong projects 1.2 cm. The downwardly directed lip or outer edge of the flange 14 will terminate approximately 0.5 cm. below the uppermost point on the arcuate flange.

Formed as described above, and noting FIGS. 1 and 3, the holding strap 10 is uniquely designed to fix a service line 20, illustrated as although not limited to a tubular conduit, to a receiving or support edge 22 of a wall-mounted furring strip 24.

In use, the service line 20 is positioned on a receiving edge 22, either horizontal or vertical, of a furring strip 24 and is forceably engaged thereagainst by the flange 14 of a strap 10 thereover, the service line 20 being received with the defined pocket 16. With the service line positioned within the pocket 16, the strap is forceably drawn to engage the service line against the receiving edge 22, at which point the face panel 12 is secured to the nailing surface 26 of the furring strip 24 by an inward driving of the nailing prong 18. This normally requires a minimal number of blows of a hammer, and has no disruptive effect on the mounted furring strip 24 itself.

The planar nature of the face panel 12 provides no disruptive projection from the planar panel-mounting surface of the furring strip 24, any minor variation in this surface being easily accommodated by the ingerent flexibility and/or compressibility of conventional wall paneling.

Figure 3:
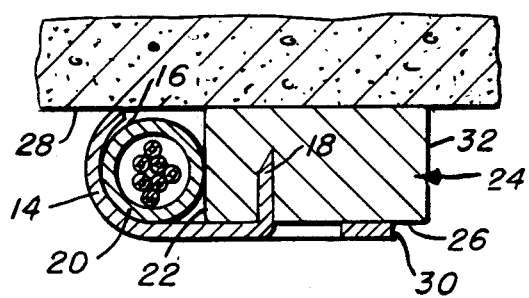
FIG. 3 is an enlarged cross-sectional detail of the holding strap taken substantially on the plane passing along line 3—3 in FIG. 1.

As will be noted in FIG. 3, the length of the line-receiving flange 14 is no greater, and preferably slightly less, than the width of the receiving edge 22 of the furring strip 24 so as to not interfere with the flush engagement of the face panel 12 against the nailing surface 26. The defined pocket 16 will accommodate the service line 20 in a nested position therein slightly spaced from the wall surface 28 with the nested accommodation of the service line 20 securing the line against both longitudinal and lateral movement. It will also be noted that the overall length of the holding strap 10 is such as to position the free outer edge 30 thereof inward of the edge 32 of the furring strip opposed from the receiving edge 22.

Figure 4:
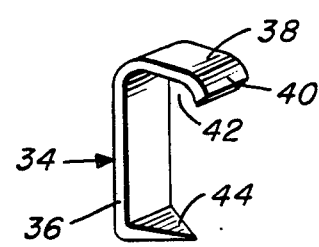
FIG. 4 is a perspective view of a modified form of holding strap also illustrated in FIG. 1; and, FIG. 5 is an enlarged cross-sectional detail through the modified holding strap taken substantially on a plane passing along line 5—5 in FIG. 1.
Figure 5:
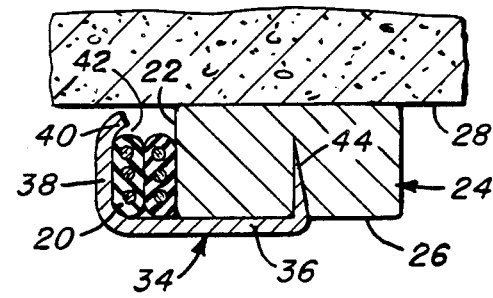

FIGS. 4 and 5 detail a holding strap 34 which is a smaller, lighter variation of the strap 10, and is preferably formed of 16 gauge galvanized steel sheet material. The strap 34 includes an elongate planar face panel 36 with a laterally directed mounting flange 38 integral at one end thereof. The flange 38 is generally planar along the central extent thereof with a downwardly angled or arcing outer end portion or lip 40 which defines a retaining end and ling-receiving pocket 42 between this outer end and the face panel 36. Preferably an arcuate joinder section will be defined between the flange 38 and the corresponding end of the face panel 36 for maximum strength.

The opposite end of the face panel 36, remote from the flange 38, includes an integral laterally projecting nailing prong 44 formed thereon and preferably folded laterally from the planar face panel 36. The prong 44 projects laterally to the same side of the face panel 36 as the flange 38 and is provided, similar to the prong 18, with a sharpened penetrating point.

Dimensionally, the holding strap 34 will preferably be 1.0 cm. wide and 3.5 cm. long. The flange 38 will have a length of 1.6 cm. with the outer end portion 40 thereof downturned approximately 0.4 cm. The prong 44 will have a length of 1.2 cm.

In using the holding strap 34 as suggested in FIG. 1 and FIG. 5, the service line 20, in this instance dual Romex wires or cables, is positioned over the receiving edge 22 of the furring strip 24. The holding strap flange 38 is then positioned over the service line 20 and the strap 24 drawn toward the receiving surface 22 to effectively engage the service line or lines 20 thereagainst and in a stabilized confined manner within the formed pocket 42. The face panel 36, overlying the nailing surface 26 of the furring strip 24, is then affixed to this surface 26 by an inward driving of the nailing prong 44. This normally requires a single hammer blow and has no disruptive effect on the furring strip or the mounting thereof.

It will be appreciated that the holding straps 10 and 34 are equally adapted for securing service lines along the side edges of wall studs prior to mounting wall board. Whether used on furring strips or studding, the holding straps, through the planar nature of the face panels, form no disruption in the planar nailing surface which receives the wall board or the like. The line-holding flange projects solely inwardly relative to the mounted face panel to overlie a corresponding receiving edge of the furring strip or stud. Similarly, the nailing prong projects in the same direction as the flange and is driven into the furring strip or stud. The mounted service line, received within the pocket defined by the face panel and holding flange, is fixed against lateral shifting without requiring reliance on other means, for example the block wall itself.

In a further more basic variation of the holding strap, the holding flange may be planar for the full length thereof and project perpendicularly from the face panel.

The projection of the holding flange solely to one side of the face panel for an engagement of a service line therebeneath and laterally to the same side of the face panel as the flange, uniquely adapts the holding strap for use in mounting service lines along edges of furring strips or the like perpendicular to the main nailing surface thereof and with no disruptive projection laterally outward of the nailing surface.

The holding straps will be utilized at appropriate spacing along a service line as required by code or, in the absence of specific requirements, as desired to provide for a stable fixing of the line. Both forms of holding strap, formed of rigid metal, are inexpensive items in terms of material costs and in labor requirements associated with the mounting of the straps. As desired, the various corners and edges of the straps can be rounded or otherwise finished to avoid any potential for damage to the mounted service lines.

I claim:

1. For use in the mounting and retention of a service line on a nailing member having a line-receiving edge and a nailing surface laterally thereof, a holding strap, said holding strap having a planar face panel engageable against the nailing surface, fastener means for fixing said face panel to the nailing surface, said face panel having opposed ends, and a holding flange integral with one panel end and extending laterally from said face panel solely to one side thereof for overlying and retention of a service line on the line-receiving edge of the nailing member, said flange terminating in a free outer end remote from the plane of said face panel.

2. The holding strap of claim 1 wherein the free outer end of said flange is turned to define a receiving pocket between said outer end and said face panel.

3. The holding strap of claim 2 wherein said flange is generally arcuate.

4. The holding strap of claim 3 wherein said fastener means comprises a nailing prong integral with said face panel and extending laterally therefrom to the same side thereof as said holding flange.

5. The holding strap of claim 4 wherein said nailing prong is at the end of the face panel remote from said flange.

6. The holding strap of claim 1 wherein said fastener means comprises a nailing prong integral with said face panel and extending laterally therefrom to the same side thereof as said holding flange.

* * * * *